United States Patent [19]

Shioya et al.

[11] Patent Number: 5,541,673
[45] Date of Patent: Jul. 30, 1996

[54] PROJECTOR HAVING A HALFWAVE PLATE DISPOSED IN LIGHT-LEAVING SIDE OF A LIGHT VALVE

[75] Inventors: Yukinori Shioya; Masao Imai, both of Tokyo, Japan

[73] Assignee: NEC Corporation, Japan

[21] Appl. No.: 298,579

[22] Filed: Aug. 31, 1994

[30] Foreign Application Priority Data

Sep. 3, 1993 [JP] Japan .................. 5-220014

[51] Int. Cl.⁶ .................................... H04N 9/31
[52] U.S. Cl. ................. 348/752; 348/757; 353/20
[58] Field of Search ..................... 348/761, 762, 348/751, 752, 757; 353/20, 31, 34; H04N 9/31

[56] References Cited

U.S. PATENT DOCUMENTS

| | | | |
|---|---|---|---|
| 5,164,821 | 11/1992 | Tanaka et al. | 348/762 |
| 5,237,435 | 8/1993 | Kurematsu et al. | 348/751 |
| 5,267,029 | 11/1993 | Kumematsu et al. | 348/751 |
| 5,374,968 | 12/1994 | Haven et al. | 348/757 |

FOREIGN PATENT DOCUMENTS

| 6019012 | 1/1994 | Japan | 348/751 |
|---|---|---|---|

*Primary Examiner*—Safet Metjahic
*Assistant Examiner*—Jeffrey S. Murrell
*Attorney, Agent, or Firm*—Ostrolenk, Faber, Gerb & Soffen, LLP

[57] ABSTRACT

In a projector comprising three image forming devices, disposed between a separation optical section and a combination optical section, for processing a red, a green, and a blue light beams, at least one of the three image forming devices comprises a polarization direction converting means, such as a halfwave plate for converting polarization direction for one of the red, the green, and the blue image light beams so that one of a color combining dichroic mirrors has a cutoff wavelength of spectral characteristic which shifts toward outside for one of the red, the green, and the blue central wavelengths from that of one of a color separating dichroic mirrors. The halfwave plate may be disposed in a light-leaving side of at least one of the three image forming devices.

5 Claims, 10 Drawing Sheets

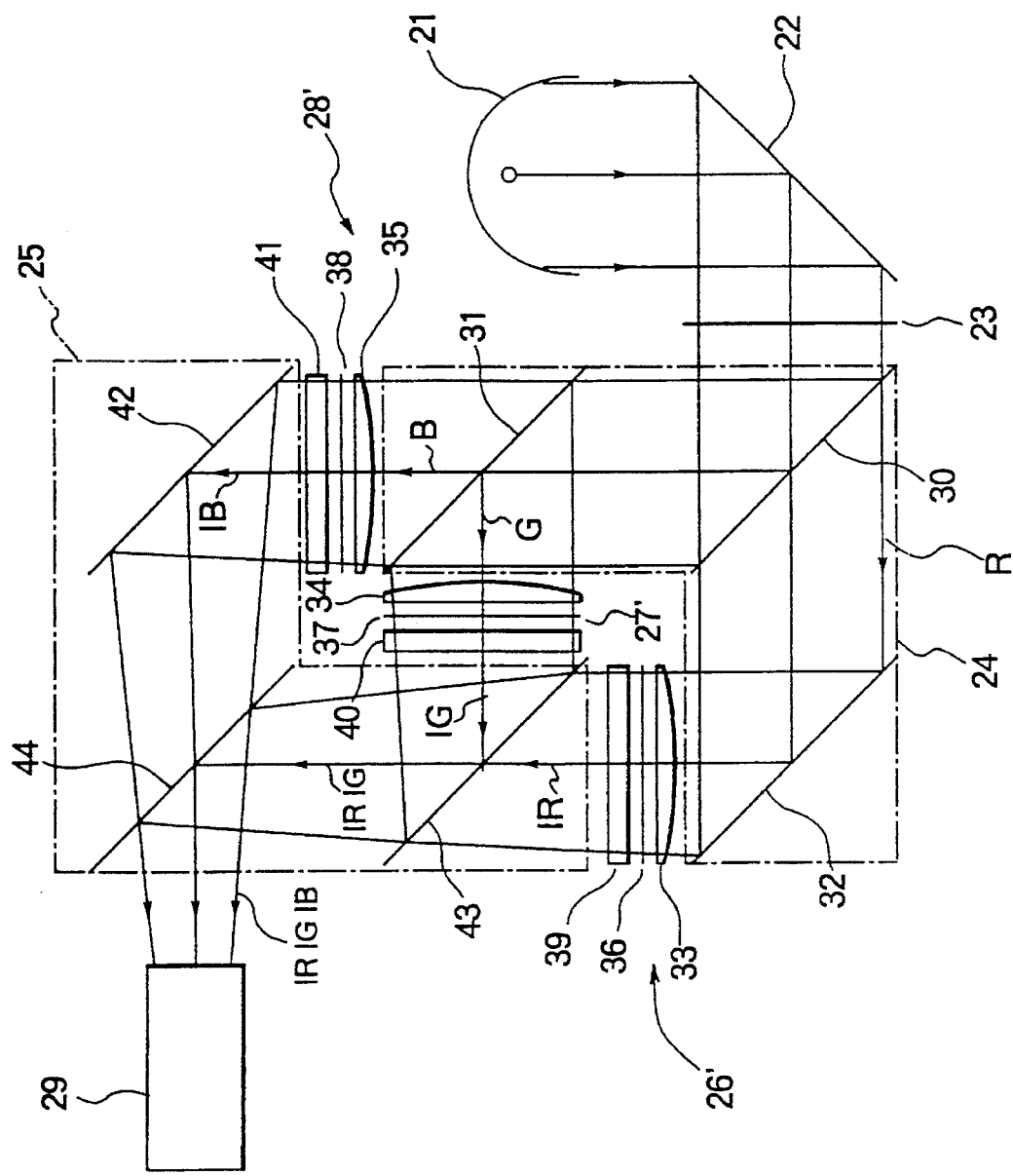
FIG. 1 [PRIOR ART]

FIG. 2 [PRIOR ART]
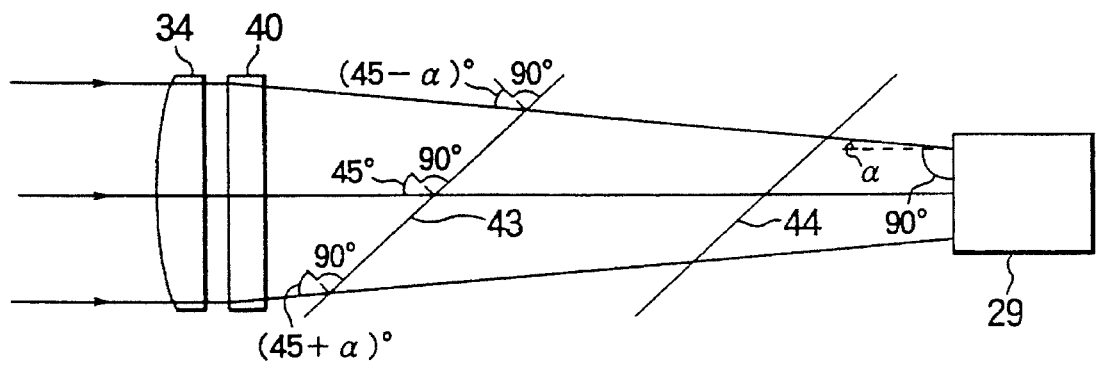
FIG. 3 [PRIOR ART]
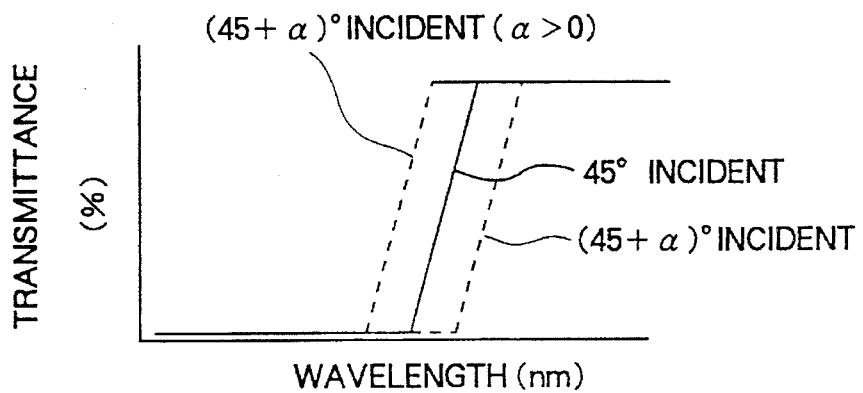

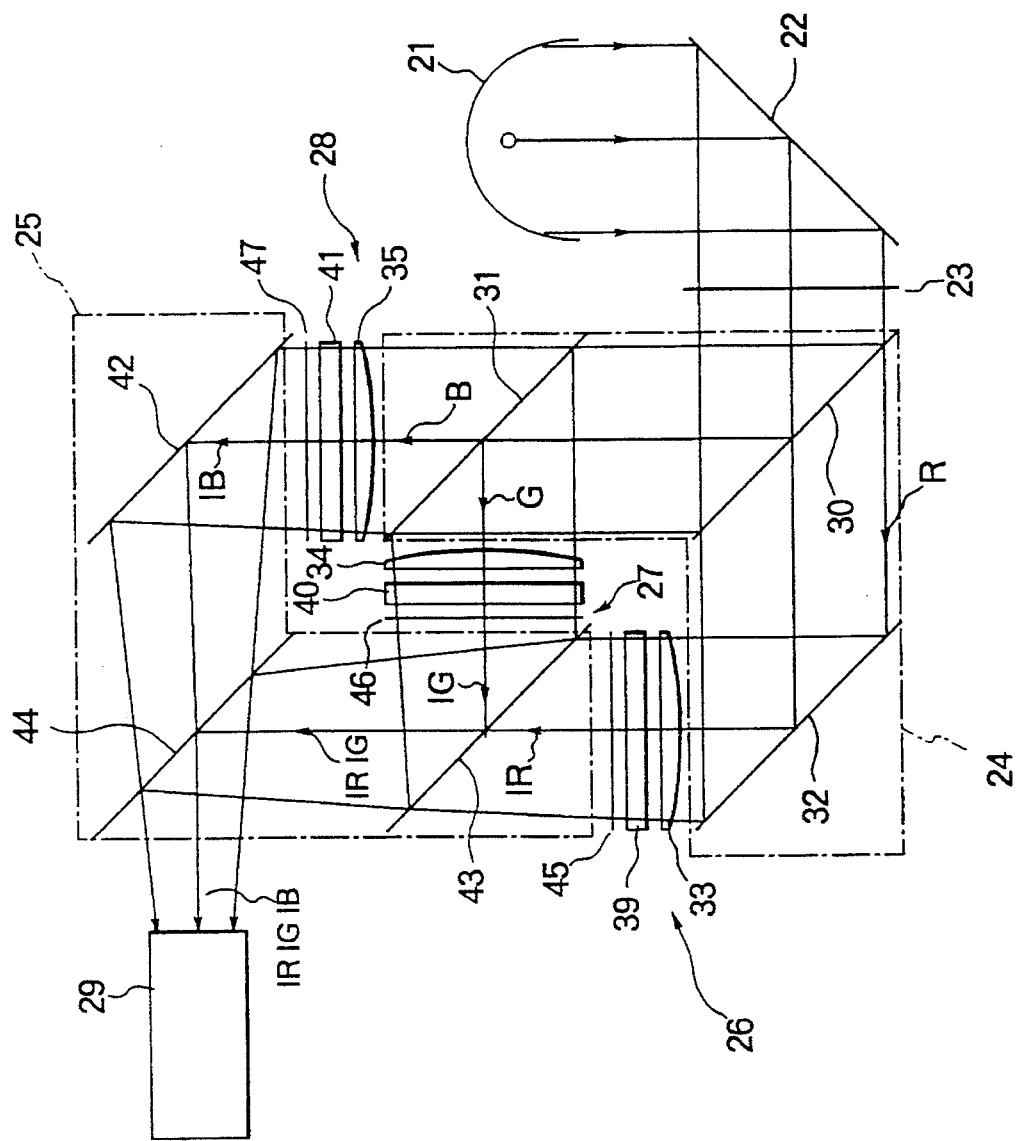

SPECTRAL CHARACTERISTIC
OF THE BLUE LIGHT PATH

POLARIZATION DIRECTION OF INCIDENT LIGHT 22.5°  45°

S-POLARIZATION DIRECTION

SLOW AXIS OF THE HALFWAVE PLATE 49,50,51

POLARIZATION DIRECTION OF LEAVING LIGHT

P-POLARIZATION DIRECTION

45°

22.5°

SLOW AXIS OF THE HALFWAVE PLATE 52,53,54

PROJECTOR HAVING A HALFWAVE PLATE DISPOSED IN LIGHT-LEAVING SIDE OF A LIGHT VALVE

BACKGROUND OF THE INVENTION

This invention relates to a projector for projecting a full-color image on a screen and, more particularly, to a liquid crystal projector which uses three light valves as an image forming device to display images of three primary color lights, such as red, green, and blue lights, respectively, and which combines the red, the green, and the blue lights from those light valves into one full-color image light, and which projects this light.

The conventional projector comprises a light source, a cold mirror, a cut filter, a color separation optical section, a color combination optical section, three image forming devices, and a projection lens.

The color separation optical section separates a visible ray into a separated red light beam, a separated green light beam, and a separated blue light beam B. More specifically, the color separation optical section comprises a first color separating dichroic mirror for red transmission, a second color separating dichroic mirror for blue transmission. The first color separating dichroic mirror transmits the red light beam and reflects both the green light beam and the blue light beam. Both the green light beam and the blue light beam from the first color separating dichroic mirror enter the second color separating dichroic mirror. The second color separating dichroic mirror transmits the separated blue light beam and reflects the separated green light beam.

Each of three image forming devices comprises a condenser lens, a narrow band pass filter, and a light valve. The condenser lens converges the separated color light beam (the separated red, green, and blue light beams) which is perfect parallel light, and make amount of light to be entered to the projector lens increase so as to increase a brightness around a projector screen. The condenser lens transmits a converged color light beam (a converged red, green, and blue light beams). The narrow band pass filter narrows the wavelength band of the converged color light beam to transmit a narrowed color light beam (a narrowed red, green, and blue light beams) with a central wavelength. The narrowed color light beam enters the light valve. Thereafter, the light valve modulates the narrowed color light beam in accordance with a control signal from a driving circuit to form a red optical image. The light valve produces a color image light beam (a red, green, and blue image light beams) indicative of the optical image.

Each of the red, green, and blue image light beams enters the color combination optical section. The color combination optical section comprises a first color combination dichroic mirror and a second color combination dichroic mirror. The first combination dichroic mirror transmits the red image light beam and reflects the green image light beam. That is, the first color combination dichroic mirror combines the red image light beam with the green image light beam to produce a color combined image light beam to the second color combination dichroic mirror. The second color combination dichroic mirror transmits the blue image light beam and reflects the color combined image light beam. That is, the second color combination dichroic mirror combines the blue image light beam with the color combined image light beam to produce a final color combined image light beam to the projector lens.

As well known in the art, the spectral characteristic of the dichroic mirror varies in accordance with the incident angle of incident light.

That is, the first color combination dichroic mirror shows predetermined spectral characteristic to light entering on its center portion, while showing spectral characteristics shifted on the shorter wavelength side or longer wavelength side to light entering on either end portion. Therefore, the full-color image to be projected on the projection surface will inevitably have low brightness and irregular color.

To solve above problems, in the conventional projector, the narrow band pass filter for reducing the color nonuniformity of the projected image was provided. However, the conventional projector is complex in constitution and is high in cost.

Another conventional projector has been proposed by Tanaka and the others (U.S. Pat. No. 5,164,821) for reducing color nonuniformity of the projected image. The other conventional projector is similar to above-mentioned conventional projector except that three halfwave plates are disposed in the light-leaving sides or light-incident sides of three light valves.

A halfwave plate converts the direction of polarization so that the color light with p-polarized light component may pass through a light valve disposed on incident side, when incident light with (p+s)/2-polarized light component enters to the light valve. The (p+s)/2-polarized light component is called a mean component. The light valve uses the color light of the p-polarized light component and form an optical image. Furthermore, by rotating the halfwave plate, the direction of polarization may be continuously controlled, so that the spectral distribution characteristic of the color light entering the light valve may be controlled in a range from the p-polarized light component to the s-polarized light component.

A gradient width is defined as a difference between the wavelength when the transmittance is 10% and the wavelength when it is 90%. The gradient width is greater in the mean component than the p-polarized light component. The smaller the gradient width of the dichroic mirror, the smaller becomes the change of brightness and chromaticity of the color light on the light valve with respect to the change of the spectral transmittance of the dichroic mirror due to incident angle dependence.

Since the light from the light source is not a perfect parallel light, the incident angle of the light entering the dichroic mirror varies depending on the incident location of the incident light entering the dichroic mirror. The greater the incident angle, the shorter wavelength side the spectral characteristic is shifted to, and when the incident angle is smaller, it is shifted to the longer wavelength side.

This change of the spectral transmittance due to incident angle into the dichroic mirror is smaller in the color light of either one of the p-polarized light component or the s-polarized light component than the color light of the mean component. Therefore, the color nonuniformity of the projected image can be reduced by using either the p-polarized component and s-polarized component. However, in the other conventional projector, because the spectral characteristic of the dichroic mirror shifts in accordance with incident angle dependence continuously, the color nonuniformity of the projected image due to incident angle dependence occurs.

SUMMARY OF THE INVENTION

It is therefore an object of this invention to provide a projector which enables to reduce almost perfectly the projected image projected on the screen and to make simple in constitution and low in cost.

According to an aspect of this invention, a projector comprises visible light generating means for generating visible light containing red, green, and blue components which have red, green, blue central wavelengths, respectively. Coupled to the visible light generating means optically, separation optical means separates the visible light into the red, the green, and the blue components. The separation optical means transmits a red light beam consisting of the red component, a green light beam consisting of the green component, and a blue light beam consisting of the blue component. The separation optical means comprises a plurality of color separating dichroic mirrors. Combination optical means combines red, green, and blue image light beams into a final color combined light beam. The combination optical means comprises a plurality of color combining dichroic mirrors. Projecting means projects a final color combined light beam on a screen. Disposed between the separation optical means and the combination optical means, three image forming devices process the red, the green, and the blue light beams on the basis of three control signals to form the red, the green, and the blue image light beams. At least one of the three image forming devices comprises a polarization direction converting means for converting polarization direction for one of the red, the green, and the blue image light beams so that one of the color combining dichroic mirrors has a cutoff wavelength of a spectral characteristic which shifts toward outside for one of the red, the green, and the blue central wavelengths from that of one of the color separating dichroic mirrors.

According to another aspect of this invention, a projector comprises visible light generating means for generating visible light containing red, green, and blue components which have red, green, blue central wavelengths, respectively. Coupled to the visible light generating means optically, separation optical means separates the visible light into a separated red light beam consisting of the red component, a separated green light beam consisting of the green component, and a separated blue light beam consisting of the blue component. The separation optical means comprises a first color separating dichroic mirror for transmitting the separated red light beam and a second color separating dichroic mirror for transmitting the separated blue light beam. Combination optical means combines a red image light beam, a green image light beam, and a blue image light beams into a final color combined light beam. The combination optical means comprises a first color combining dichroic mirror for transmitting said red image light beam and a second color combining dichroic mirror for transmitting said blue image light beam. Projecting means projects the final color combined light beam on a screen. Responsive to the separated red light beam, first image forming means processes the separated light beam on the basis of a red control signal to form a red optical image. The first image forming means comprises a first condenser lens for converging the separated red light beam to produce a converged red light beam, a first light valve for modulating the converged red light beam in response to the red control signal to form the red image light beam indicative of the red optical image, and first polarization direction converting unit for converting polarization direction for the red image light beam so that the first color combining dichroic mirror has a cutoff wavelength of a spectral characteristic which shifts toward short wavelength side for the red central wavelength from that of the first color separation dichroic mirror. Responsive to the separated green light beam, second image forming means processes the separated green light beam on the basis of a green control signal to form a green optical image. The second image forming means comprises a second condenser lens for converging the separated green light beam to produce a converged green light beam, a second light valve for modulating the converged green light beam in response to the green control signal to form the green image light beam indicative of the green optical image, and second polarization direction converting unit for converting polarization direction for the green image light beam so that the first and the second color combining dichroic mirrors have cutoff wavelengths of spectral characteristics which shift toward short and long wavelength sides for the green central wavelength from those of the first and the second color separation dichroic mirrors, respectively. Responsive to the separated blue light beam, third image forming means processes the separated blue light beam on the basis of a blue control signal to form a red optical image. The third image forming means comprises a third condenser lens for converging the separated blue light beam to produce a converged blue light beam, a third light valve for modulating the converged blue light beam in response to the blue control signal to form the blue image light beam indicative of said blue optical image, and third polarization direction converting unit for converting polarization direction for the blue image light beam so that the third color combining dichroic mirror has the cutoff wavelength of a spectral characteristic which shifts toward long wavelength side for said blue central wavelength from that of the second color separation dichroic mirror.

BRIEF DESCRIPTION OF THE DRAWING

FIG. 1 is a diagram showing constitution of a conventional projector;

FIG. 2 is a diagram showing a reflecting light path of a color combination dichroic mirror disposed along a green light path as a transmission light path;

FIG. 3 is a diagram showing polarization dependence of a spectral characteristic for a dichroic mirror;

FIG. 4 is a diagram showing constitution of a projector according to a first embodiment;

DESCRIPTION OF THE PREFERRED EMBODIMENTS

Figure 5:
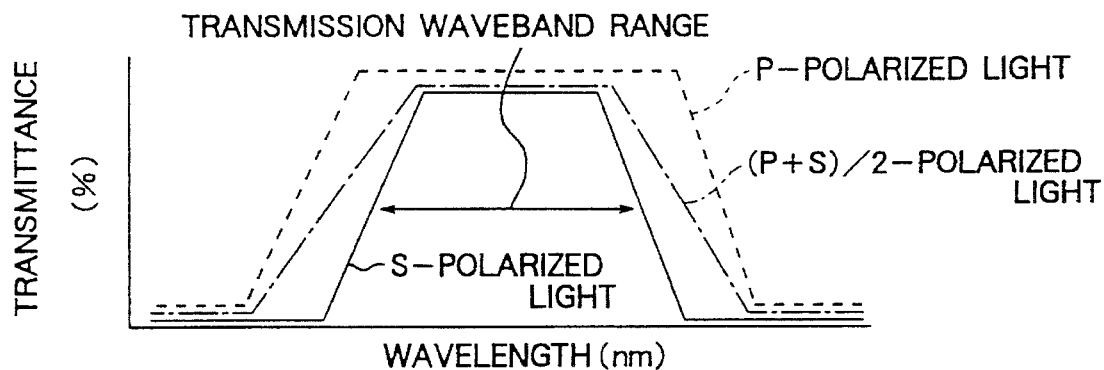
FIG. 5 is a diagram showing polarization dependent characteristic of the dichroic mirror.

Referring to FIGS. 1, 2, and 3, a conventional liquid crystal projector will be described at first in order to facilitate an understanding of the present invention.

FIG. 1 shows a constitution of a conventional liquid crystal projector. FIG. 2 is a diagram showing a reflecting light path of a color combination dichroic mirror disposed along a green light path as a transmission light path. FIG. 3 is a diagram showing polarization dependence of a spectral characteristic for a dichroic mirror.

In FIG. 1, the conventional liquid crystal projector comprises a light source 21, a cold mirror 22, a cut filter 23, a color separation optical section 24, a color combination optical section 25, a first image forming device 26', a second image forming device 27', a third image forming device 28', and a projection lens 29. The light source 21 emits a white ray which comprises a visible ray, an ultraviolet ray, and an infrared ray. The visible ray contains a red, a green, and a blue light beams R, G, and B. The white ray is reflected by the cold mirror 22 to enter the cut filter 23. The cut filter 23 cuts the ultraviolet ray and the infrared ray from the white ray to transmit the visible ray. The visible ray enters to the color separation optical section 24.

The color separation optical section 24 separates the visible ray into a separated red light beam R, a separated green light beam G, and a separated blue light beam B. More specifically, the color separation optical section 24 comprises a first color separating dichroic mirror 30 for red transmission, a second color separating dichroic mirror 31 for blue transmission, and a reflecting mirror 32. The first color separating dichroic mirror 30 transmits the red light beam R and reflects both the green light beam G and the blue light beam B. The reflecting mirror 32 reflects the red light beam R from the first color separating dichroic mirror 30 as the separated red light beam R to enter it to the first image forming device 26'. Both the green light beam G and the blue light beam B from the first color separating dichroic mirror 30 enter the second color separating dichroic mirror 31. The second color separating dichroic mirror 31 transmits the blue light beam B as the separated blue light beam B and reflects the green light beam G as the separated green light beam G. The separated green light beam G enters the second liquid crystal device 27'. The separated blue light beam B enters the third liquid crystal device 28'.

The first image forming device 26' comprises a first condenser lens 33, a first narrow band pass filter 36, and a first light valve 39. The first condenser lens 33 is disposed in the light-incident side of the first light valve 39. The first narrow band pass filter 36 is disposed between the first condenser lens 33 and the first light valve 39. The first condenser lens 33 converges the separated red light beam R which is perfect parallel light, and make amount of light to be entered to the projector lens 29 increase so as to increase a brightness around a projector screen (not shown). The first condenser lens 33 transmits a converged red light beam. The first narrow band pass filter 36 narrows the wavelength band of the converged red light beam R to transmit a narrowed red light beam R with a central red wavelength. The narrowed red light beam R enters the first light valve 39. Thereafter, the first light valve 39 modulates the narrowed red light beam R in accordance with a red control signal from a driving circuit (not shown) to form a red optical image. The first light valve 39 produces a red image light beam IR indicative of the red optical image.

Similarly, the second image forming device 27' comprises a second condenser lens 34, a second narrow band pass filter 37, and a second light valve 40. The second condenser lens 34 is disposed in the light-incident side of the second light valve 40. The second narrow band pass filter 37 is disposed between the second condenser lens 34 and the second light valve 40. The second condenser lens 34 converges the green light beam G which is perfect parallel light, and make amount of light to be entered to the projector lens 29 increase so as to increase a brightness around the projector screen. The second condenser lens 34 transmits a converged green light beam. The second narrow band pass filter 37 narrows the wavelength band of the converged green light beam G to transmit a narrowed green light beam G with a central green wavelength. The narrowed green light beam G enters the second light valve 40. Thereafter, the second light valve 40 modulates the narrowed green light beam G in accordance with a green control signal from the driving circuit to form a green optical image. The second light valve 40 produces a green image light beam IG indicative of the green optical image.

Similarly, the third image forming device 28 comprises a third condenser lens 35, a third narrow band pass filter 38, and a third light valve 41. The third condenser lens 35 is disposed in the light-incident side of the third light valve 41. The third narrow band pass filter 38 is disposed between the third condenser lens and the third light valve 41. The third condenser lens 35 converges the blue light beam B which is perfect parallel light, and make amount of light to be entered to the projector lens 29 increase so as to increase a brightness around the projector screen. The third condenser lens 35 transmits a converged blue light beam. The third narrow band pass filter 38 narrows the wavelength band of the converged blue light beam B to transmit a narrowed blue light beam B with a central blue wavelength. The narrowed blue light beam B enters the third light valve 41. Thereafter, the third light valve 41 modulates the narrowed blue light beam B in accordance with a blue control signal from the driving circuit (not shown) to form a blue optical image. The third light valve 41 produces a blue image light beam IB indicative of the blue optical image.

Each of the red, green, and blue image light beams IR, IG, and IB enters the color combination optical section 25.

The color combination optical section 25 comprises a reflecting mirror 42, a first color combination dichroic mirror 43, a second color combination dichroic mirror 44. The first color combination dichroic mirror 43 transmits the red image light beam IR and reflects the green image light beam IG. That is, the first color combination dichroic mirror 43 combines the red image light beam IR with the green image light beam IG to produce a color combined image light beam IRIG to the second color combination dichroic mirror 44. The reflecting mirror 42 reflects the blue image light beam IB. The second color combination dichroic mirror 44 transmits the blue image light beam IB and reflects the color combined image light beam IRIG. That is, the second color combination dichroic mirror 44 combines the blue image light beam IB with the color combined image light beam IRIG to produce a final color combined image light beam IRIGIB to the projector lens 29.

In FIG. 2, the separated green light beam G enters the second condenser lens 34 to be converged. The converged green light beam G enters the second light valve 40. Thereafter, the second light valve 40 modulates the converged green light beam G in accordance with the green control signal from the driving circuit (not shown) to form the green optical image. The second light valve 40 produces the green image light beam IG to the first color combination dichroic mirror 43. The first color combination dichroic mirror 43 reflects the green image light beam IG. The second color combination dichroic mirror 44 reflects the color combined image light beam IRIG to produce the final color combined image light beam IRIGIB to the projector lens 29.

As shown in FIG. 2, an incident angle of the green image light beam IG to the first color combination dichroic mirror 43 varies depending on an incident location of the first color combination dichroic mirror 43. The first and the second color combination dichroic mirrors 43 and 44 are disposed so as to become 45 degrees to a light axis of the green light beam G. In the event, when α degrees is a converged angle determined by focal length of the second condenser lens 34, the incident angle of the converged green light beam G which enters on one end portion of the second light valve 40 becomes (45−α) degrees, and the incident angle of the converged green light beam G which enters on the other end portion of the second light valve 40 becomes (45+α) degrees. Generally, the dichroic mirror controls a spectral characteristic of transmission light and reflection light according to utilize interference of light.

Accordingly, the spectral characteristic of the first color combination dichroic mirror 43 varies in accordance with the incident angle of incident light.

Generally, the dichroic mirror is designed to show a predetermined spectral characteristic to light entering to the incident surface at an angle of 45 degrees, so that it shows a spectral characteristic shifted on the short wavelength side or long wavelength side with respect to light entering at an angle larger or smaller than 45 degrees. As shown in FIG. 2, the incident angle to the first color combination dichroic mirror 43 is almost 45 degrees in the center portion of mirror and becomes larger than 45 degrees as the incident point approaches toward one end from the mirror's center portion, while becoming smaller than 45 degrees as the incident point approaches toward the other end from the mirror's center portion.

Accordingly, as shown in FIG. 3, the first color combination dichroic mirror 43 shows predetermined spectral characteristic to light entering on its center portion, while showing spectral characteristics shifted on the shorter wavelength side or longer wavelength side to light entering on either end portion ((45+α) degrees or (45−α) degrees). That is, the color combined image light beam IRIG has a color with well-balanced red and green components in center portion of the first color combination dichroic mirror 43, but shows a poor green component on the side corresponding to one side of it, while showing a poor red component on the side corresponding to the other side of it. This is similar as regards the red light path and the blue light path. Therefore, the full-color image to be projected on a projection surface, such as the projector screen, will inevitably have low brightness and irregular color.

To solve above problems, in the conventional projector, as shown in FIG. 1, the narrow band pass filter for reducing the color nonuniformity of the projected image was provided.

However, the conventional projector is complex in constitution and is high in cost. In addition, since transmittance of the narrow band pass filter is about. 90%, loss of amount of light becomes about 10%.

Tanaka et al (U.S. Pat. No. 5,164,821) discloses an image projection system for reducing color nonuniformity of the projected image. The image projection system is similar to that illustrated in FIG. 1 except that three halfwave plates are disposed on the light-leaving side or light-incident side of three light valves.

A halfwave plate converts the direction of polarization so that the color light with p-polarized light component may pass through a light valve disposed on incident side, when incident light with (p+s)/2-polarized light component enters to the light valve. The (p+s)/2-polarized light component is called a mean component. The light valve uses the color light of the p-polarized light component and form an optical image. Furthermore, by rotating the halfwave plate, the direction of polarization may be continuously controlled, so that the spectral distribution characteristic of the color light entering the light valve may be controlled in a range from the p-polarized light component to the s-polarized light component.

A gradient width is defined as a the difference between the wavelength when the transmittance is 10% and the wavelength when it is 90%. The gradient width is greater in the mean component than the p-polarized light component. The smaller the gradient width of the dichroic mirror, the smaller becomes the change of brightness and chromaticity of the color light on the light valve with respect to the change of the spectral transmittance of the dichroic mirror due to incident angle dependence.

Since the light from the light source is not a perfect parallel light, the incident angle of the light entering the dichroic mirror varies depending on the incident location of the incident light entering the dichroic mirror. The greater the incident angle, the shorter wavelength side the spectral characteristic is shifted to, and when the incident angle is smaller, it is shifted to the longer wavelength side.

This change of the spectral transmittance due to incident angle into the dichroic mirror is smaller in the color light of either one of the p-polarized light component or the s-polarized light component than the color light of the mean component.

Accordingly, the color nonuniformity of the projected image can be reduced by using either the p-polarized component and s-polarized component.

However, in Tanaka et al, because the spectral characteristic of the dichroic mirror shifts in accordance with incident angle dependence continuously, the color nonuniformity of the projected image due to incident angle dependence occurs.

Referring to FIG. 4, the description will proceed to a projector according to a first embodiment of the present invention. The illustrated projector is similar to that illustrated in FIG. 1 except that the first image forming device 26', the second image forming device 27', and the third image forming device 28' are modified into a first image forming device 26, a second image forming device 27, and the third image forming device 28, respectively. The similar parts are represented by the same references as in FIG. 1. A combination of the light source 21, the cold filter 22, and the cut filter 23 serves as a visible light generating section.

Responsive to the separated red light beam R, the first image forming device 26 processes the separated red light beam R on the basis of the red control signal to form the red optical image. More specifically, the first image forming device 26 comprises the first condenser lens 33, the first light valve 39, and a first halfwave plate 45 as a polarization direction converting unit. The first condenser lens 33 is disposed in the light-incident side of the first light valve 39. The first halfwave plate 45 is disposed in the light-leaving side of the first light valve 39. The first condenser lens 33 converges the separated red light beam R to produce the converged red light beam R. The first light valve 39 modulates the converged red light beam R in response to the red control signal to form the red image light beam IR indicative of the red optical image. The first halfwave plate 45 converts polarization direction for the red image light beam IR so that the first color combining dichroic mirror 43 has a cutoff wavelength of a mesial point in a spectral characteristic which shifts toward short wavelength side for the red central wavelength from that of the first color separation dichroic mirror 30. It is to be noted that the cutoff wavelength is a wavelength at 50% transmittance.

Responsive to the separated green light beam G, the second image forming device 27 processes the separated green light beam G on the basis of the green control signal to form the green optical image. More particularly, the second image forming device 27 comprises second condenser lens 34, second light valve 40, and second halfwave plate 46 as a polarization direction converting unit. The second condenser lens 34 is disposed in the light-incident side of the second light valve 40. The second halfwave plate 46 is disposed in the light-leaving side of the second light valve 40. The second condenser lens 34 converges the separated green light beam G to produce the converged green light beam G. The second light valve 40 modulates the converged green light beam G in response to the green control signal to form the green image light beam IG indicative of the green optical image. The second halfwave plate 46 converts polarization direction for the green image light beam IG so that the first and the second color combining dichroic mirrors 43 and 44 have cutoff wavelengths of spectral characteristics which shift toward short and long wavelength sides for the green central wavelength from those of the first and the second color separation dichroic mirrors 30 and 31, respectively.

Responsive to the separated blue light beam B, the third image forming device 28 processes the separated blue light beam B on the basis of the red control signal to form the blue optical image. More specifically, the third image forming device 28 comprises third condenser lens 35, third light valve 41, and third halfwave plate 47 as a polarization direction converting unit. The third condenser lens 35 is disposed in the light-incident side of the third light valve 41. The third halfwave plate 47 is disposed in the light-leaving side of the third light valve 41. The third condenser lens 35 converges the separated blue light beam B to produce the converged blue light beam B. The third light valve 41 modulates the converged blue light beam B in response to the blue control signal to form the blue image light beam IB indicative of the blue optical image. The third halfwave plate 47 converts polarization direction for the blue image light beam IB so that the second color combining dichroic mirror 44 has a cutoff wavelength of a spectral characteristic which shifts toward long wavelength side for the blue central wavelength from that of the second color separation dichroic mirror 31.

Three halfwave plates 45, 46, and 47 are disposed in the light-leaving sides of three light valves 39, 40, and 41 away from three light valves 39, 40, and 41, respectively. Really, the three halfwave plates 45, 46, and 47 are adhered to the three light valves 39, 40, and 41 with analyzers thereof (not shown) so as not to be complex in structure.

The red light beam R reaches to the projector lens 29 through the first color separation dichroic mirror 30, the reflecting mirror 32, the first image forming device 26, the first color combination dichroic mirror 43, and the second color combination dichroic mirror 44 along a red light path. Similarly, the green light beam G reaches to the projector lens 29 through the first color separation dichroic mirror 30, the second color separation dichroic mirror 31, the second image forming device 27, the first color combination dichroic mirror 43, and the second color combination dichroic mirror 44 along a green light path. Similarly, the blue light beam B reaches to the projector lens 29 through the first color separation dichroic mirror 30, the second color separation dichroic mirror 31, the third image forming device 28, the reflecting mirror 42, and the second color combination dichroic mirror 44 along a blue light path.

FIG. 5 shows polarization dependent characteristic of the dichroic mirror. The spectral characteristic of the dichroic mirror varies in response to the polarization direction for the color light beams entered to the dichroic mirror. In FIG. 5, a solid line represents the spectral characteristic of s-polarized light component, and a broken line represents the spectral characteristic of p-polarized light component, and a single-dot chain line represents the spectral characteristic of (p+s)/2-polarized light component. The (p+s)/2-polarized light is polarized light having mean component of the s-polarized light and the p-polarized light.

As shown in FIG. 5, the dichroic mirror generally has a transmission waveband range. When incident light entering the dichroic mirror is the p-polarized light, the transmission waveband range becomes wide in comparison with the s-polarized light. When the incident light entering the dichroic mirror is the (p+s)/2-polarized light, the transmission waveband range is medium range between the s-polarized light and the p-polarized light. In this event, supposing the cutoff wavelengths of the spectral characteristic for the first and the second color combination dichroic mirrors 43 and 44 to be similar to the cutoff wavelengths of the spectral characteristic for the first and the second color separation dichroic mirrors 30 and 31, respectively, the transmission waveband ranges of the first and the second color combination dichroic mirrors 43 and 44 change according to the control of polarization direction. The polarization direction is controlled by disposing the first, the second, and the third halfwave plates 45, 46, and 47 located at light-leaving sides of the first, the second, and the third light valves 39, 40, and 41, respectively. According to the control of the polarization direction, the p-polarized light enters the first and the second color combination dichroic mirrors 43 and 44 along the red and the blue light paths, and the s-polarized light enters the first and the second color combination dichroic mirrors 43 and 44 along a green light path.

In the present invention, when the cutoff wavelengths of the spectral characteristic for the first and the second color separation dichroic mirrors 30 and 31 are measured by using incident light with (p+s/2)-polarized direction, the cutoff wavelengths of the spectral characteristic for the first and the second color separation dichroic mirrors 30 and 31 are set so that those become 580 nm and 500 nm, respectively. Similarly, the cutoff wavelengths of the spectral characteristic for the first and the second color combination dichroic mirrors 43 and 44 are set so that those become 580 nm and 500 nm, respectively.

Figure 6:
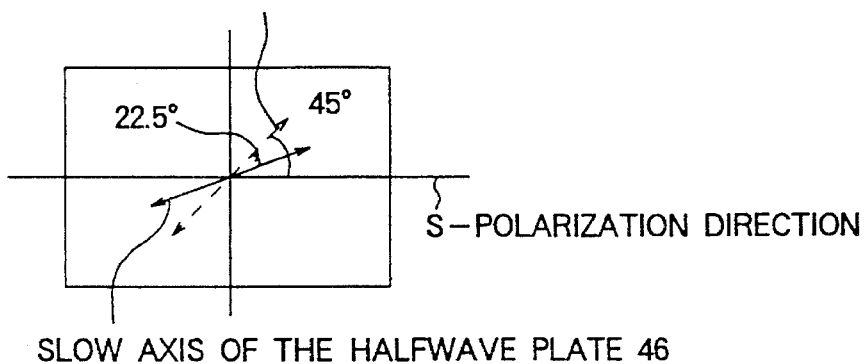
FIG. 6 is a diagram showing the direction of a slow axis of a halfwave plate disposed along a green light path of the projector illustrated in FIG. 4.

FIG. 6 is a diagram showing direction of a slow axis of the halfwave plate 46 disposed along the green light path of the projector illustrated in FIG. 4. As shown in FIG. 6, the angle formed by s-polarization direction for the first color combination dichroic mirror 43 and polarization direction of leaving light from the second lightvalve 40 is 45 degrees. Accordingly, when the angle formed by s-polarization direction for the first color combination dichroic mirror 43 and the direction of the slow axis of the second halfwave plate 46 is 22.5 degrees, the leaving light from the second halfwave plate 46 is converted to the s-polarized light.

Figure 7:
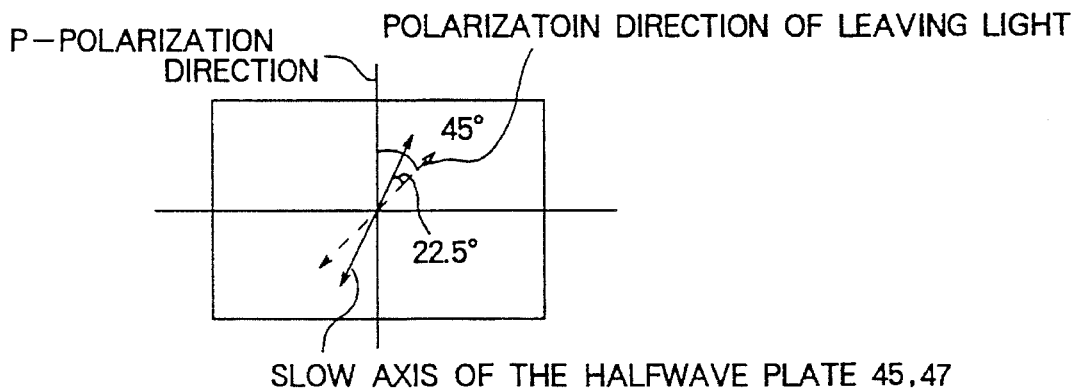
FIG. 7 is a diagram showing direction of the slow axis of a halfwave plate disposed along a red or a blue light path of the projector illustrated in FIG. 4.

FIG. 7 is a diagram showing the direction of the slow axis of the halfwave plates 45 and 47 disposed along the red or the blue light paths of the projector illustrated in FIG. 4. As shown in FIG. 7, the angle formed by the p-polarization direction for the first color combination dichroic mirror 43 and polarization direction of leaving light from the first lightvalve 39 is 45 degrees. Accordingly, when the angle formed by the p-polarization direction for the first color combination dichroic mirror 43 and the direction of the slow axis of the first halfwave plate 45 is 22.5 degrees, the leaving light from the first halfwave plate 45 is converted to the p-polarized light.

Figure 8:
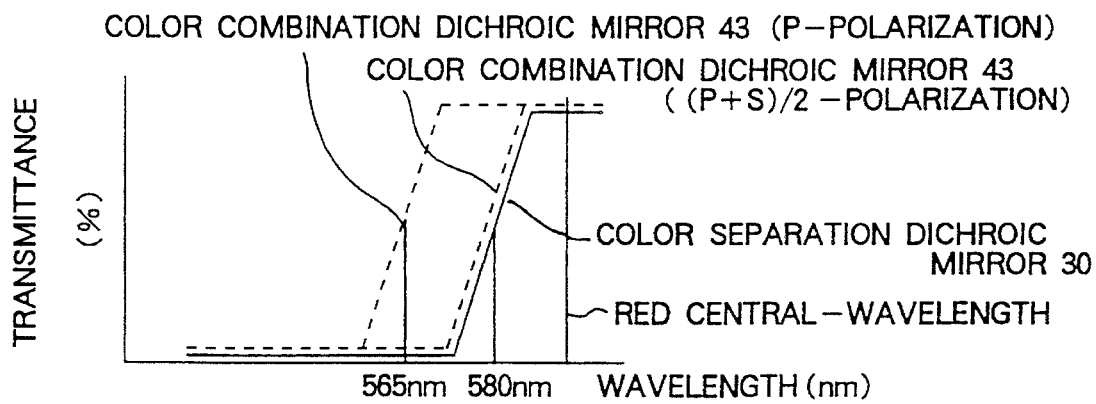
FIG. 8 is a diagram showing spectral characteristic of a dichroic mirror disposed along the red light path according to the first embodiment.

FIG. 8 is a diagram showing the spectral characteristic of the dichroic mirrors 30 and 43 disposed along the red light path according to the first embodiment. When the red image light beam IR with the (p+s)/2-polarization direction enters to the first color combination dichroic mirror 43, the cutoff wavelength of spectral characteristic for the first color combination dichroic mirror 43 becomes about 580 nm. On the other hand, when the red image light beam IR with the p-polarization direction enters to the first color combination dichroic mirror 43, the cutoff wavelength of spectral characteristic for the first combination dichroic mirror 43 becomes 565 nm. Accordingly, the cutoff wavelength of spectral characteristic for the first color combination dichroic mirror 43 shifts toward short wavelength side for the red central-wavelength of 630 nm from the cutoff wavelength of 580 nm of spectral characteristic for the first color separation dichroic mirror 30.

Figure 9:
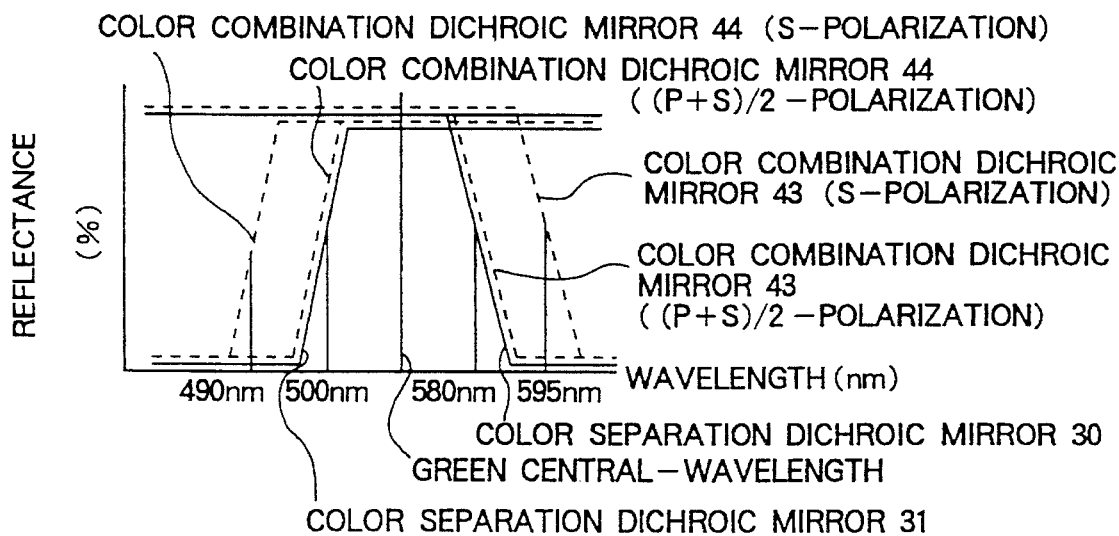
FIG. 9 is a diagram showing spectral characteristic of a dichroic mirror disposed along the green light path according to the first embodiment.

FIG. 9 is a diagram showing spectral characteristic of the dichroic mirrors 30, 31, 43, and 44 disposed along the green light path according to the first embodiment. When the green image light beam IG with the (p+s)/2-polarization direction enters to the first color combination dichroic mirror 43, the cutoff wavelength of the spectral characteristic for the first color combination dichroic mirror 43 becomes about 580 nm. On the other hand, when the green image light beam IG with the s-polarization direction enters to the first color combination dichroic mirror 43, the cutoff wavelength of the spectral characteristic for the first color combination dichroic mirror 43 becomes 595 nm. Accordingly, the cutoff wavelength of the spectral characteristic for the first color combination dichroic mirror 43 shifts toward long wavelength side for the green central-wavelength (540 nm) from the cutoff wavelength (580 nm) of the spectral characteristic for the first color separation dichroic mirror 30.

When the green image light beam IG with the (p+s)/2-polarization direction enters to the second color combination dichroic mirror 44, the cutoff wavelength of spectral characteristic for the second color combination dichroic mirror 44 becomes about 500 nm. On the other hand, when the green image light beam IG with the s-polarization direction enters to the second color combination dichroic mirror 44, the cutoff wavelength of the spectral characteristic for the second color combination dichroic mirror 44 becomes 490 nm. Accordingly, the cutoff wavelength of the spectral characteristic for the second color combination dichroic mirror 44 shifts toward short wavelength side for the green central-wavelength (540 nm) from the cutoff wavelength (500 nm) of spectral characteristic for the second color separation dichroic mirror 31.

Figure 10:
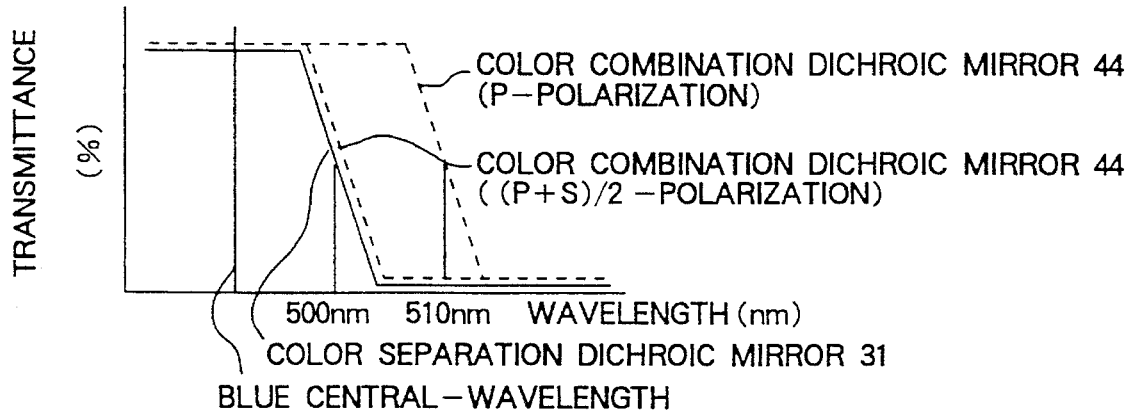
FIG. 10 is a diagram showing spectral characteristic of a dichroic mirror disposed along a blue light path according to the first embodiment.

FIG. 10 is a diagram showing the spectral characteristic of the dichroic mirrors 31 and 44 disposed along the blue light path according to the first embodiment. When the blue image light beam IB with the (p+s)/2-polarization direction enters to the second color combination dichroic mirror 44, the cutoff wavelength of the spectral characteristic for the second color combination dichroic mirror 44 becomes about 500 nm. On the other hand, when the blue image light beam IB with the p-polarization direction enters to the second color combination dichroic mirror 44, the cutoff wavelength of the spectral characteristic for the second color combination dichroic mirror 44 becomes 510 nm. Accordingly, the cutoff wavelength of the spectral characteristic for the second color combination dichroic mirror 44 shifts toward long wavelength side for the blue central-wavelength (460 nm) from the half-wavelength (500 nm) of the spectral characteristic for the second color separation dichroic mirror 31.

Turning to FIGS. 2 and 3, since the visible light from the light source 21 is converged by the first, the second, and the third condenser lenses 7, 8, and 9, the incident angle of the incident light passing through the upper side of the first, the second, and the third light valves 39, 40, and 41 is different from the incident angle of the incident light passing through the lower side of them. That is, the incident angle of the incident light entering to the first and the second color combination dichroic mirrors 43 and 44 vary depending on the location where the incident light enters to the first, the second, and the third condenser lenses 33, 34, and 35.

However, in the present invention, when the polarization directions of the image light beams entering to the combination optical device 25 are controlled by the first, the second, and the third halfwave plate 45, 46, and 47, the cutoff wavelength of the spectral characteristic for the first and the second color combination dichroic mirrors 43 and 44 shifts toward outside for the red, the green, and the blue central-wavelength from those of the first and the second color separation dichroic mirrors 30 and 31. Therefore, even if the spectral characteristic for the first and the second color combination dichroic mirrors 43 and 44 vary according to incident angle dependence, the spectral characteristic of the red, green, and blue light paths does not vary.

That is, each of the spectral characteristics of the red, green, and blue light paths is characteristic which produces by multiplying the spectral characteristic of the color combination dichroic mirror and the spectral characteristic of the color separation dichroic mirror, so that the spectral characteristics for the red, green, and blue light paths do not vary, as a result.

As described above, the spectral distribution characteristic of three color light beams entering the color combination dichroic mirror does not vary due to the incident angle dependence. Accordingly, the color nonuniformity of a projected image on the screen can be reduced. In addition, it is possible to enable to make simple in constitution and low in cost.

Figure 11:
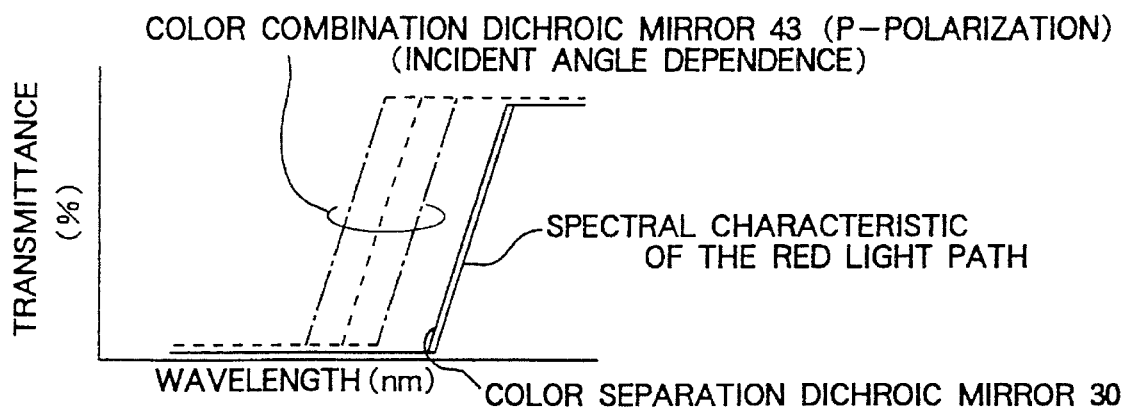
FIG. 11 is a diagram showing spectral characteristic for the red light path according to the first embodiment.

FIG. 11 is a diagram showing spectral characteristic for the red light path. In FIG. 11, a broken line denotes the spectral distribution characteristic of the first color combination dichroic mirror 43 due to an incident of the red image light beam IR with p-polarization direction, and a single-dot chain line denotes shift range of spectral characteristic for the first color combination dichroic mirror 43 due to the incident angle dependence.

Turning to FIG. 8, the spectral distribution characteristic of the first color combination dichroic mirror 43 due to the incident of the red image light beam IR with the p-polarization direction shifts toward short wavelength side for the spectral distribution characteristic of the first color combination dichroic mirror 43 due to the incident of the red image light beam IR with (p+s)/2-polarization direction. As shown in FIG. 11, since the shift range of the spectral distribution characteristic (broken line) varies within range of zero in transmittance for the first color separation dichroic mirror 30, the spectral characteristic for the red light path does not vary.

Figure 12:
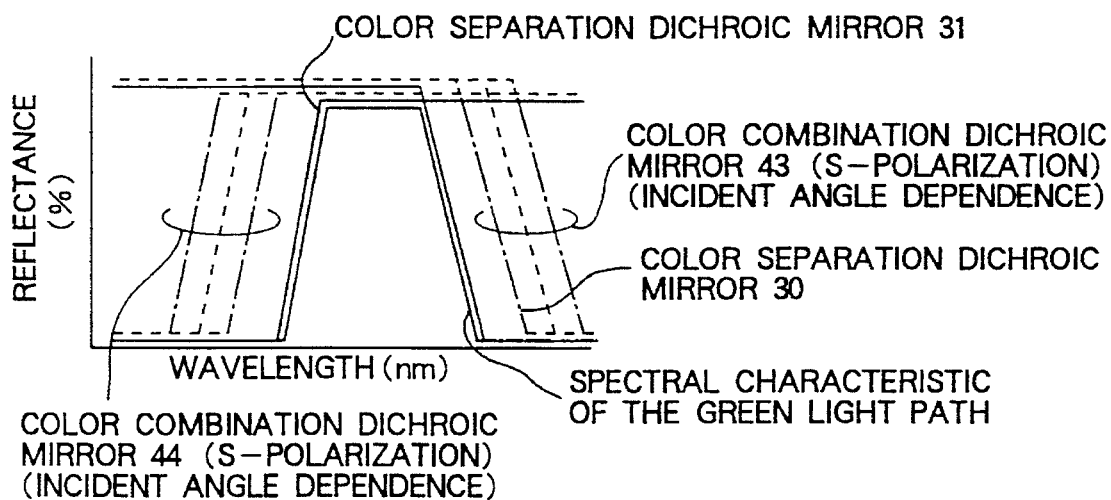
FIG. 12 is a diagram showing spectral characteristic for the green light path according to the first embodiment.

FIG. 12 is a diagram showing spectral characteristic for the green light path. In FIG. 12, a broken line shown at the long wavelength side denotes the spectral distribution characteristic of the first color combination dichroic mirror 43 due to the incident of the green image light beam IG with the s-polarization direction, and a single-dot chain line shown at the long wavelength side denotes shift range of spectral characteristic for the first color combination dichroic mirror 43 due to the incident angle dependence. The broken line shown at the short wavelength side denotes the spectral distribution characteristic of the second color combination dichroic mirror 44 due to the incident of the green image light beam IG with the s-polarization direction, and the single-dot chain line shown at the short wavelength side denotes shift range of spectral characteristic for the second color combination dichroic mirror 44 due to the incident angle dependence.

Turning to FIG. 9, the spectral distribution characteristic of the first color combination dichroic mirror 43 due to the incident of the green image light beam IG with the s-polarization direction shifts toward long wavelength side for the spectral distribution characteristic of the first color combination dichroic mirror 43 due to the incident of the green image light beam IG with the (p+s)/2-polarization direction. The spectral distribution characteristic of the second color combination dichroic mirror 44 due to the incident of the green image light beam IG with the s-polarization direction shifts toward short wavelength side for the spectral distribution characteristic of the second color combination dichroic mirror 44 due to the incident of the green image light beam IG with the (p+s)/2-polarization direction.

As shown in FIG. 12, since the shift range of the spectral distribution characteristic (broken line) varies within range of zero in transmittance for the first and the second color separation dichroic mirror 30 and 31, the spectral characteristic for the green light path does not vary.

Figure 13:
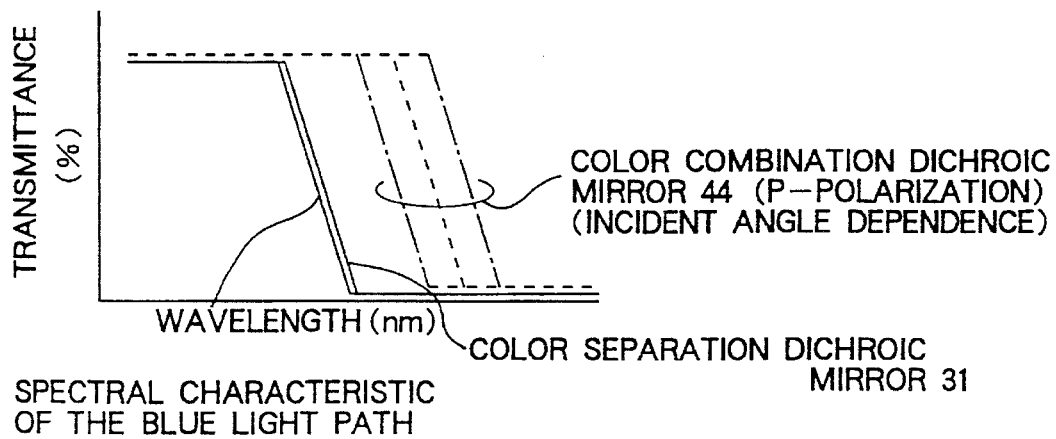
FIG. 13 is a diagram showing spectral characteristic for the blue light path according to the first embodiment.

FIG. 13 is a diagram showing spectral characteristic for the blue light path. In FIG. 13, a broken line denotes the spectral distribution characteristic of the second color combination dichroic mirror 44 due to the incident of the blue image light beam IB with the p-polarization direction, and the single-dot chain line denotes shift range of spectral characteristic for the second color combination dichroic mirror 44 due to the incident angle dependence.

Turning to FIG. 10, the spectral distribution characteristic of the second color combination dichroic mirror 44 due to the incident of the blue image light beam IB with the p-polarization direction shifts toward long wavelength side for the spectral distribution characteristic of the second color combination dichroic mirror 44 due to the incident of the blue image light beam IB with the (p+s)/2-polarization direction.

As shown in FIG. 13, since the shift range of the spectral distribution characteristic (broken line) varies within range of zero in transmittance for the second color separation dichroic mirror 30, the spectral characteristic of the blue light path does not vary.

As apparent from FIGS. 11, 12, and 13, even if the spectral characteristic of the first and the second color combination dichroic mirrors 43 and 44 vary in response to the incident angle dependence of them, each of the spectral characteristic of three color light paths does not vary. Accordingly, the color nonuniformity of the projected image projected on the screen can be reduced almost perfectly. In addition, it is possible to enable to make simple in constitution and low in cost.

Figure 14:
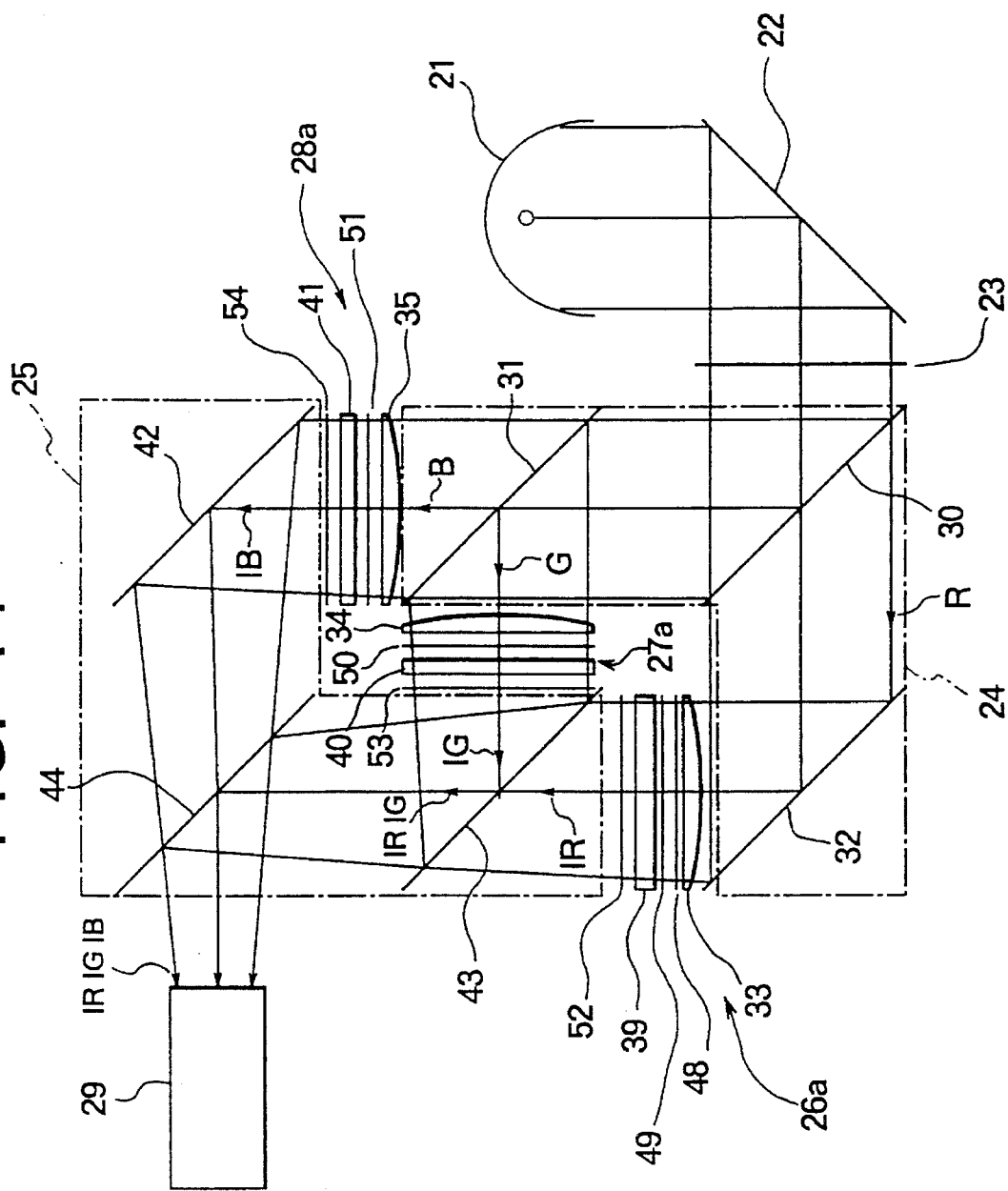
FIG. 14 is a diagram showing a constitution of a projector according to a second embodiment.

Referring to FIG. 14, the description will proceed to a projector according to a second embodiment of the present invention. The illustrated projector is similar to that illustrated in FIG. 4 except that the first image forming device 26, the second image forming device 27, and the third image forming device 28 are modified into a first image forming device 26a, a second image forming device 27a, and the third image forming device 28a, respectively. The similar parts are represented by the same references as in FIG. 4.

The first image forming device 26a comprises the first condenser lens 33, the first light valve 39, the first incident and the first leaving halfwave plates 49 and 52 as the polarization direction converting device, and a dichroic filter 48 for red transmission. The first condenser lens 33 is disposed in the light-incident side of the first light valve 39. The first incident halfwave plate 49 is disposed in the light-incident side of the first light valve 39. The first leaving halfwave plate 52 is disposed in the light-leaving side of the first light valve 39. The dichroic filter 48 enables to make color purity of the projected image improve. Responsive to the separated red light beam, the first image forming device 26a processes the separated red light beam on the basis of the red control signal to form the red optical image. The first condenser lens 33 converges the separated red light beam R to produce the converged red light beam R. The converged red light beam R enters to the first incident halfwave plate 49 through the dichroic filter 48. The first incident halfwave plate 49 converts the polarization direction for the red image light beam IR so that the first color combining dichroic mirror 43 has the cutoff wavelength of the spectral characteristic which shifts toward short wavelength side for the red central wavelength from that of the first color separation dichroic mirror 30. For example, when incident light for the first incident halfwave plate 49 is the s-polarized light, the light passing through the first light valve 39 becomes (p+s)/2-polarized light. A following incident light for the first incident halfwave plate 49 represents as the s-polarized light.

The first light valve 39 modulates the converged red light beam with (p+s)/2-polarization direction in response to the red control signal to form a red image light beam IR indicative of the red optical image. The first leaving halfwave plate 52 converts the polarization direction for the red image light beam IR so that the first color combining dichroic mirror 43 has the cutoff wavelength of the spectral characteristic which shifts toward short wavelength side for the red central wavelength from that of the first color separation dichroic mirror 30. That is, when incident light for the first leaving halfwave plate 52 is the (p+s/2)-polarized light, the light passing through the first leaving halfwave plate 52 becomes the p-polarized light.

The second image forming device 27a comprises the second condenser lens 34, the second light valve 40, the second incident and the second leaving halfwave plates 50 and 53 as the polarization direction converting unit. The second image forming device 27a is similar in structure and operation to the first image forming device 26a except that the dichroic filter 48 is omitted from the first image forming device 26a.

Similarly, the third image forming device 28a comprises the third condenser lens 35, the third light valve 41, the third incident and the third leaving halfwave plates 51 and 54 as the polarization direction converting unit. The third image forming device 28a is similar in structure and operation to the first image forming device 26a except that the dichroic filter 48 is omitted from the first image forming device 26a. In other words, the third image forming device 28a is similar in structure to the second image forming device 27a.

In the second embodiment according to the present invention, when the cutoff wavelength of the spectral characteristic for the first and the second color separation dichroic mirrors 30 and 31 is measured by using incident light with s-polarized direction, those is 560 nm and 500 nm, respectively. When the cutoff wavelength of the spectral characteristic for the first and the second color combination dichroic mirrors 43 and 44 is measured by using incident light with (p+s/2)-polarized direction, the cutoff wavelength of the spectral characteristic for the first and the second color combination dichroic mirrors 43 and 44 is 600 nm and 500 nm, respectively. The cutoff wavelength of spectral characteristic for the dichroic filter 48 is 600 nm. The first and the second color combination dichroic mirrors 43 and 44 and the dichroic filter 48 are set as above described.

Figure 15:
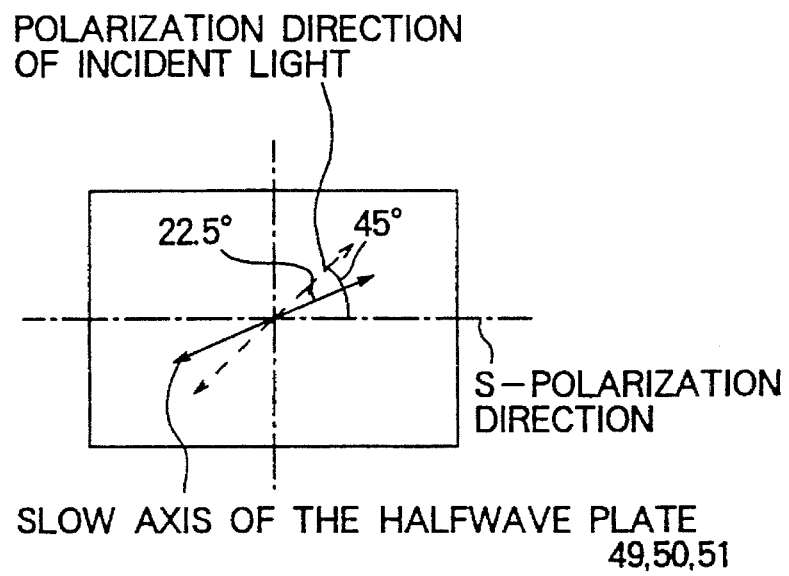
FIG. 15 is a diagram showing direction of a slow axis of a halfwave plate disposed in a light-incident side of a light valve.

FIG. 15 is a diagram showing the direction of the slow axis of the halfwave plates 49, 50, and 51 disposed in the light-incident side of a light valve. The first, the second, and the third light valves 39, 40, and 41 does 45 degrees rubbing in consideration of view angle dependence. Therefore, as shown in FIG. 15, the angle formed by the s-polarization direction for the first and the second color separation dichroic mirrors 30 and 31 and the polarization direction of the incident light (the red, the green, and the blue separated light beams R, G, and B) entered to the first, the second, and the third lightvalves 39, 40, and 41, become 45 degrees. Accordingly, when the angle formed by the s-polarization direction for the first and the second color separation dichroic mirror 30 and 31 and the direction of the slow axis of the first, the second, and the third incident halfwave plates 49, 50, and 51 is 22.5 degrees, the incident light entering to the first, the second, and the third lightvalves 39, 40, and 41 is converted to the s-polarized light.

Figure 16:
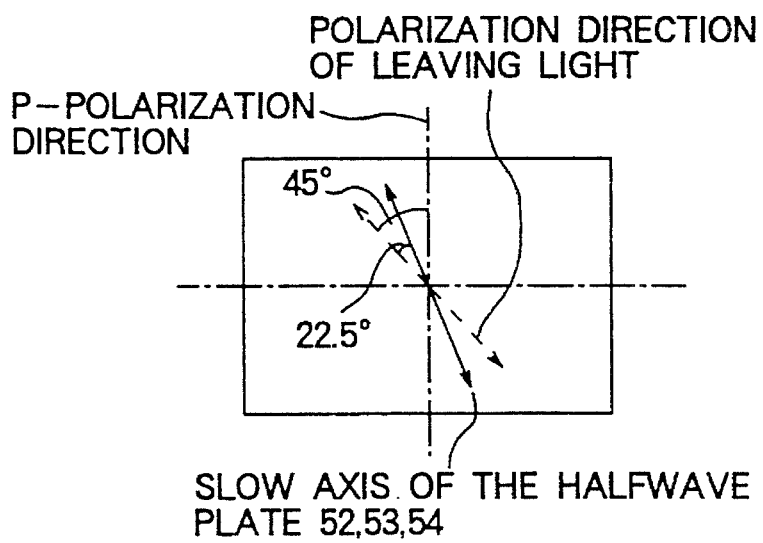
FIG. 16 is a diagram showing direction of a slow axis of a halfwave plate disposed in a light-leaving side of a light valve.

FIG. 16 is a diagram showing the direction of the slow axis of the halfwave plates 52, 53, and 54 disposed in the light-leaving side of a light valve. As shown in FIG. 16, the angle formed by the p-polarization direction for the first and the second color combination dichroic mirrors 43 and 44 and polarization direction of the leaving light (the red, the green, and the blue image light beams IR, IG, and IB) producing from the first, the second, and the third light valves 39, 40, and 41 become 45 degrees. Accordingly, when the angle formed by the p-polarization direction for the first and the second color combination dichroic mirror 43 and 44 and the direction of the slow axis of the first, the second, and the third leaving halfwave plates 52, 53, and 54 is 22.5 degrees, the leaving light producing from the first, the second, and the third lightvalves 39, 40, and 41 is converted to the p-polarized light.

Figure 17:
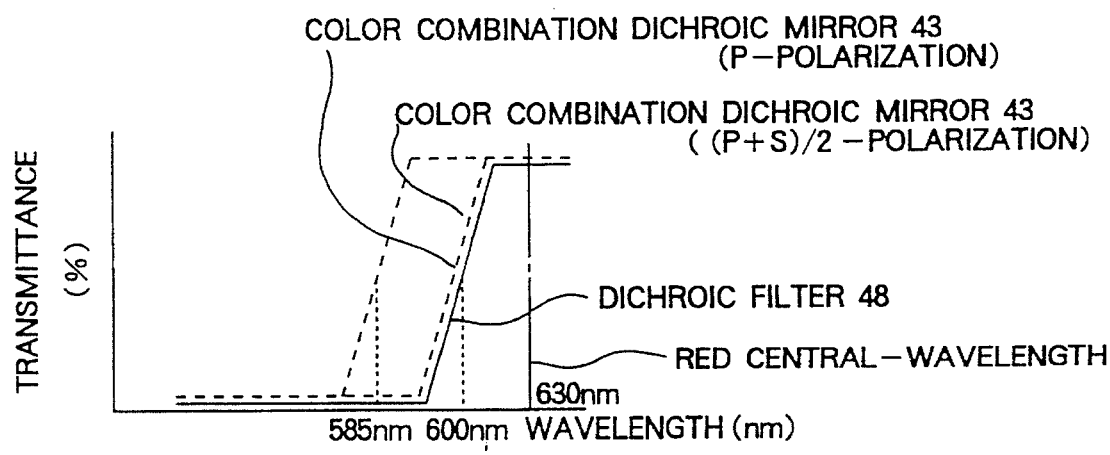
FIG. 17 is a diagram showing spectral characteristic of a dichroic mirror and a dichroic filter disposed along a red light path of the projector illustrated in FIG. 14 according to the second embodiment.

FIG. 17 is a diagram showing the spectral characteristic of the dichroic mirror 43 and the dichroic filter 48 disposed along the red light path according to the second embodiment. When the red image light beam IR with the (p+s)/2-polarization direction enters to the first color combination dichroic mirror 43, the cutoff wavelength of spectral characteristic for the first color combination dichroic mirror 43 becomes about 600 nm. It is to be noted that incident light for the first incident halfwave plate 49 is s-polarized light.

On the other hand, when the red image light beam IR with the p-polarization direction enters to the first color combination dichroic mirror 43, the cutoff wavelength of the spectral characteristic for the first combination dichroic mirror 43 becomes 585 nm. Accordingly, the cutoff wavelength of the spectral characteristic for the first color combination dichroic mirror 43 shifts toward short wavelength side for the red central-wavelength (630 nm) from the cutoff wavelength (600 nm) of the spectral characteristic for the first color separation dichroic mirror 30.

Figure 18:
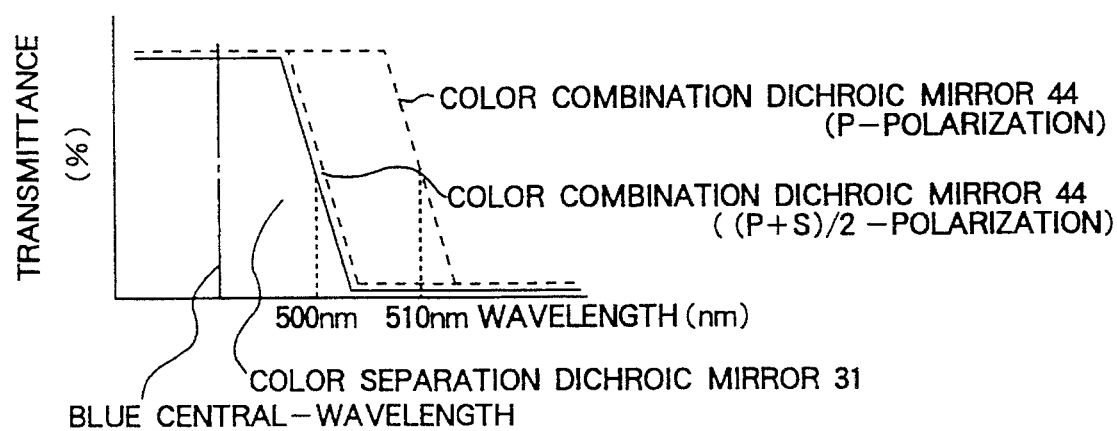
FIG. 18 is a diagram showing spectral characteristic of a dichroic mirror disposed along a blue light path of the projector illustrated in FIG. 14 according to the second embodiment.

FIG. 18 is a diagram showing spectral characteristic of the dichroic mirrors 31 and 44 in the blue light path according to the second embodiment. When the blue image light beam IB with the (p+s)/2-polarization direction enters to the second color combination dichroic mirror 44, the cutoff wavelength of the spectral characteristic for the second color combination dichroic mirror 44 becomes about 500 nm. It is to be noted that incident light for the third incident halfwave plate 51 is the s-polarized light.

On the other hand, when the blue image light beam IB with the p-polarization direction enters to the second color combination dichroic mirror 44, the cutoff wavelength of the spectral characteristic for the second color combination dichroic mirror 44 becomes 510 nm. Accordingly, the cutoff wavelength of the spectral characteristic for the second color combination dichroic mirror 44 shifts toward long wavelength side for the blue central-wavelength (460 nm) from the cutoff wavelength (500 nm) of the spectral characteristic for the second color separation dichroic mirror 31.

Turning to FIGS. 2 and 3, since the visible light from the light source 21 is converged by the first, the second, and the third condenser lenses 33, 34, and 35, the incident angle of the incident light passing through the upper side of the first, the second, and the third light valves 39, 40, and 41 is different from the incident angle of the incident light passing through the lower side of them. That is, the incident angle of the incident light entering to the first and the second color combination dichroic mirrors 43 and 44 vary depending on the location where the incident light enters to the first, the second, and the third condenser lenses 33, 34, and 35.

However, in the present invention, when the polarization direction of three separated light beams producing from the separation optical device 24 and the polarization direction of three image light beams IR, IG, and IB entering to the combination optical device 25 is controlled by the first, the second, and the third incident halfwave plates 45, 46, and 47, and the first, the second, and the third leaving halfwave plates 52, 53, and 54, respectively, the cutoff wavelength of the spectral characteristic for the first and the second color combination dichroic mirrors 43 and 44 shifts toward outside for the red, the green, and the blue central-wavelength from those of the first and the second color separation dichroic mirrors 30 and 31. Therefore, even if the spectral characteristic for the first and the second color combination dichroic mirrors 43 and 44 vary according to the incident angle dependence, the spectral characteristic of the red, green, and blue light paths does not vary.

That is, each of the spectral characteristics of the red, green, and blue light paths is characteristic which produces by multiplying the spectral characteristic of the color combination dichroic mirror and the spectral characteristic of the dichroic filter, so that spectral characteristic for the red, green, and blue light paths does not vary, as a result.

As described above, the spectral distribution characteristic of three color image light beams IR, IG, and IB entering the color combination dichroic mirror does not vary due to the incident angle dependence. Accordingly, the color nonuniformity of a projected image on the screen can be reduced, and it is possible to enable to make simple in constitution and low in cost. In addition, it is possible to enable to improve color fineness of the projected image about red color component.

Figure 19:
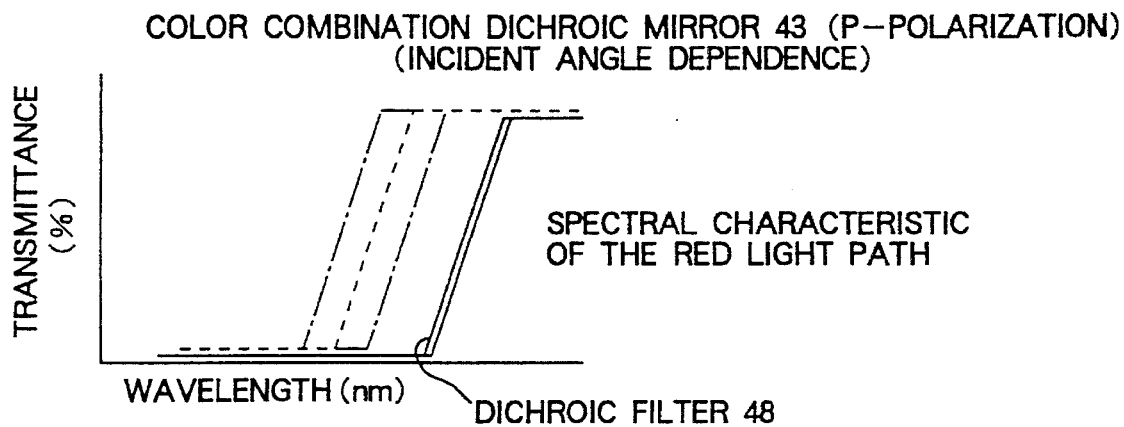
FIG. 19 is a diagram showing spectral characteristic for the red light path according to the second embodiment.

FIG. 19 is a diagram showing spectral characteristic for the red light path. In FIG. 19, a broken line denotes the spectral distribution characteristic of the first color combination dichroic mirror 43 due to the incident of the red image light beam IR with p-polarization direction, and a single-dot chain line denotes shift range due to the incident angle dependence.

Turning to FIG. 17, the spectral distribution characteristic of the color combination dichroic mirror 43 due to the incident of the red image light beam IR with the p-polarization direction shifts toward the short wavelength side for the spectral distribution characteristic of the first color combination dichroic mirror 43 due to the incident of the red image light beam IR with the (p+s)/2-polarization direction. As shown in FIG. 19, since the shift range of the spectral distribution characteristic (broken line) varies within range of zero in transmittance for the dichroic filter 48, the spectral characteristic for the red light path does not vary.

Figure 20:
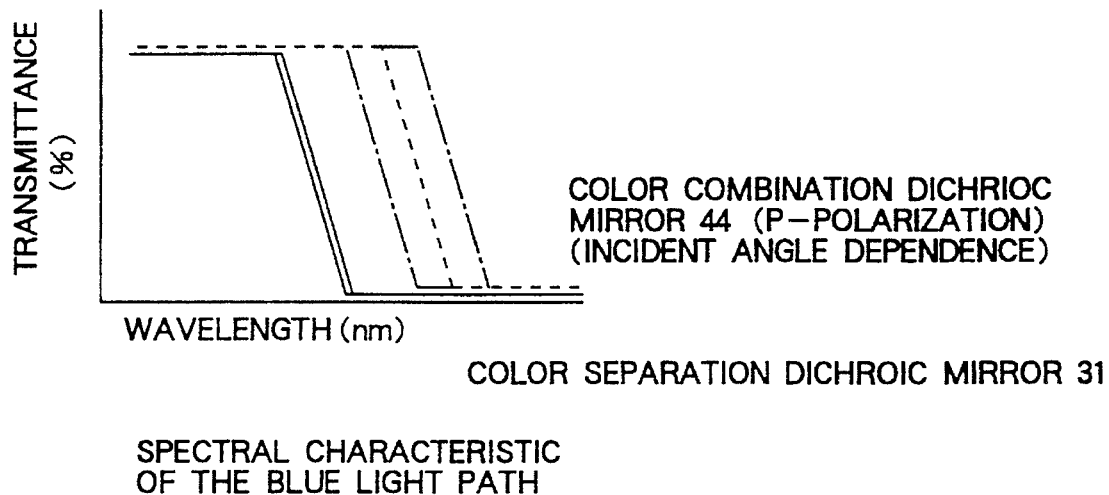
FIG. 20 is a diagram showing spectral characteristic for the blue light path according to the second embodiment.

FIG. 20 is a diagram showing spectral characteristic for the blue image light path. In FIG. 13, a broken line denotes the spectral distribution characteristic of the second color combination dichroic mirror 44 due to the incident of the blue image light beam IB with the p-polarization direction, and the single-dot chain line denotes the shift range of the spectral characteristic for the second color combination dichroic mirror 44 due to the incident angle dependence.

Turning to FIG. 18, the spectral distribution characteristic of the second color combination dichroic mirror 44 due to the incident of the blue image light beam IB with the p-polarization direction shifts toward long wavelength side for the spectral distribution characteristic of the second color combination dichroic mirror 44 due to the incident of the blue image light beam IB with the (p+s)/2-polarization direction.

As shown in FIG. 20, since the shift range of the spectral distribution characteristic (broken line) varies within range of zero in transmittance for the second color separation dichroic mirror 30, the spectral characteristic of the blue light path does not vary.

As apparent from FIGS. 19 and 20, even if the spectral characteristic of the first and the second color combination dichroic mirrors 43 and 44 vary in response to the incident angle dependence of them, each of the spectral characteristic of three color light paths does not vary. Accordingly, the color nonuniformity of the projected image projected on the screen can be reduced. In addition, it is possible to enable to make simple in constitution and low in cost. In addition, even if each of incident light beams entering to three image forming devices is light with the s-polarization direction, it is possible to enable to convert the polarization direction of leaving light beams from three image forming devices into p-polarization direction.

While this invention has thus far been described in conjunction with the preferred embodiments thereof, it will now readily be possible for those skilled in the art to develop various other embodiments of this invention. For example, the projector may comprise a halfwave plate disposed in at least one of three light valves. In the example being illustrated, it is also possible to use light valves for forming optical images depending on a video signal as changes of the birefringence or optical rotation or other electro-optical effects.

What is claimed is:

1. A projector comprising:

visible light generating means for generating visible light containing red, green, and blue components which have red, green, and blue central wavelengths, respectively;

separation optical means, optically coupled to said visible light generating means, for separating said visible light into the red, the green, and the blue components, said separation optical means transmitting a red light beam having a red component, a green light beam having a green component, and a blue light beam having a blue component, said separation optical means comprising a plurality of color separating dichroic mirrors;

combination optical means having incident angle dependance for combining red, green, and blue image light beams into a final color combined light beam, said combination optical means comprising a plurality of color combining dichroic mirrors;

projecting means for projecting said final color combined light beam on a screen; and three image forming devices, disposed between said separation optical means and said combination optical means, for processing the red, the green and the blue light beams on the basis of three control signals to form the red, the green, and the blue image light beams, at least one of said three image forming devices comprising a polarization direction converting means for converting polarization direction for one of the red, the green, and the blue image light beams so that one of the color combining dichroic mirrors has a cutoff wavelength of a spectral characteristic which is shifted apart from one of the red, the green, and the blue central wavelengths so as to compensate for said incident angle dependence of said combination optical means.

2. A projector as claimed in claim 1, wherein said polarization direction converting means is disposed in a light-leaving side of at least one of said three image forming devices.

3. A projector as claimed in claim 1, wherein said polarization direction converting means is a halfwave plate.

4. A projector comprising:

visible light generating means for generating visible light containing red, green, and blue components which have red, green, and blue central wavelengths, respectively;

separation optical means, optically coupled to said visible light generating means, for separating said visible light into a separated red light beam including a red component, a separated green light beam including a green component, and a separated blue light beam including a blue component, said separation optical means comprising a first color separating dichroic mirror for transmitting the separated red light beam and a second color separating dichroic mirror for transmitting the separated blue light beam;

combination optical means for combining a red image light beam, a green image light beam, and a blue image light beam into a final color combined light beam, said combination optical means comprising a first color combining dichroic mirror for transmitting said red image light beam and a second color combining dichroic mirror for transmitting said blue image light beam;

projecting means for projecting said final color combined light beam on a screen;

first image forming means receiving the separated red light beam, for processing the separated light beam on the basis of a red control signal to form a red optical image, said first image forming means comprising a first condenser lens for converging the separated red light beam to produce a converged red light beam, a first light valve for modulating the converged red light beam in response to the red control signal to form the red image light beam indicative of said red optical image, and first polarization direction converting unit for converting polarization direction for the red image light beam so that said first color combining dichroic mirror has a cutoff wavelength of a spectral characteristic which shifts toward short wavelength side for said red central wavelength from that of said first color separation dichroic mirror;

second image forming means, receiving the separated green light beam, for processing the separated green light beam on the basis of a green control signal to form a green optical image, said second image forming means comprising a second condenser lens for converging the separated green light beam to produce a converged green light beam, a second light valve for modulating the converged green light beam in response to said green control signal to form the green image light beam indicative of said green optical image, and second polarization direction converting unit for converting polarization direction for the green image light beam so that said first and said second color combining dichroic mirrors have cutoff wavelengths of spectral characteristics which shift toward short and long wavelength sides for said green central wavelength from those of said first and second color separation dichroic mirrors, respectively; and third image forming means receiving the separated blue light beam for processing the separated blue light beam on the basis of a blue control signal to form a red optical image, said third image forming means comprising a third condenser lens for converging the separated blue light beam to produce a converged blue light beam, a third light valve for modulating the converged blue light beam in response to the blue control signal to form the blue image light beam indicative of said blue optical image, and third polarization direction converting unit for converting polarization direction for the blue image light beam so that said third color combining dichroic mirror has the cutoff wavelength of a spectral characteristic which shifts toward long wavelength side for said blue central wavelength from that of said second color separation dichroic mirror.

5. A projector as claimed in claim 4, wherein each of said first through third polarization direction converting units is a halfwave plate.

* * * * *